US011859427B2

(12) United States Patent
Wardi

(10) Patent No.: US 11,859,427 B2
(45) Date of Patent: Jan. 2, 2024

(54) HINGE AND METHOD FOR ADJUSTING A HINGE

(71) Applicant: EMKA BESCHLAGTEILE GMBH & CO. KG, Velbert (DE)

(72) Inventor: Florian Wardi, Wuppertal (DE)

(73) Assignee: EMKA BESCHLAGTEILE GMBH & CO. KG, Velbert (DE)

(*) Notice: Subject to any disclaimer, the term of this patent is extended or adjusted under 35 U.S.C. 154(b) by 84 days.

(21) Appl. No.: 16/970,735

(22) PCT Filed: Feb. 20, 2019

(86) PCT No.: PCT/DE2019/100161
§ 371 (c)(1),
(2) Date: Aug. 18, 2020

(87) PCT Pub. No.: WO2019/161845
PCT Pub. Date: Aug. 29, 2019

(65) Prior Publication Data

US 2021/0017797 A1 Jan. 21, 2021

(30) Foreign Application Priority Data

Feb. 20, 2018 (DE) ..................... 10 2018 103 741.4

(51) Int. Cl.
*E05D 7/04* (2006.01)
*E05D 7/10* (2006.01)
*E05D 3/02* (2006.01)

(52) U.S. Cl.
CPC ............. *E05D 7/0423* (2013.01); *E05D 3/02* (2013.01); *E05D 7/1061* (2013.01);
(Continued)

(58) Field of Classification Search
CPC ....... E05D 7/0045; E05D 7/04; E05D 7/0415; E05D 7/0423; E05D 2007/0484; E05D 3/02; E05D 2003/027
See application file for complete search history.

(56) References Cited

U.S. PATENT DOCUMENTS 1,325,221 A * 12/1919 Way ...................... E05D 7/0423 16/246
4,825,507 A * 5/1989 Killingstad ........... E05D 7/0423 16/241

(Continued)

FOREIGN PATENT DOCUMENTS

DE 29808660 U1 9/1999
DE 202007011076 U1 10/2007

(Continued)

OTHER PUBLICATIONS

PCT, European Patent Office (ISA/EP), International Search Report, International Application No. PCT/DE2019/100161, 6 pages (dated May 16, 2019).

(Continued)

*Primary Examiner* — Jeffrey O'Brien
(74) *Attorney, Agent, or Firm* — Thompson Hine LLP

(57) ABSTRACT

In embodiments, a hinge includes a first hinge element for arrangement on a closing element and a second hinge element for arrangement on a frame, the first and the second hinge elements being connected to each other to pivot about a hinge axis, and at least one actuating element for adjusting the spacing of the hinge axis relative to at least one of the first and the second hinge elements.

13 Claims, 5 Drawing Sheets

(52) U.S. Cl.
CPC .................. *E05D 2003/027* (2013.01); *E05D 2007/0484* (2013.01); *E05Y 2600/528* (2013.01)

(56) References Cited

U.S. PATENT DOCUMENTS

| | | | | |
|---|---|---|---|---|
| 5,224,242 | A * | 7/1993 | Marjanovic | E05D 7/125 16/DIG. 43 |
| 5,511,287 | A * | 4/1996 | Lautenschlager | E05D 7/0407 16/236 |
| 6,609,335 | B1 * | 8/2003 | Hyakkoku | E05F 3/00 16/229 |
| 6,918,158 | B2 * | 7/2005 | Isele | E05D 7/0423 16/242 |
| 7,571,516 | B2 * | 8/2009 | Lueffe | E05D 7/0423 16/382 |
| 7,614,116 | B2 * | 11/2009 | Chen | E05D 7/04 16/238 |
| 7,698,782 | B2 * | 4/2010 | Lautenschlager | E05D 5/065 16/236 |
| 8,683,652 | B2 * | 4/2014 | Hagspiel | E05D 11/00 16/236 |
| 8,839,488 | B2 * | 9/2014 | Lowe | E05D 7/0407 16/236 |
| 9,038,242 | B2 * | 5/2015 | Chung | E05D 7/0415 16/240 |
| 9,145,721 | B2 * | 9/2015 | Bartels | E05D 7/04 |
| 9,328,545 | B1 * | 5/2016 | Ng | E05D 7/0415 |
| 9,341,010 | B2 * | 5/2016 | Pyo | E05D 7/04 |
| 9,416,573 | B2 * | 8/2016 | Sabrowski | E05D 7/0415 |
| 10,030,427 | B2 * | 7/2018 | McGregor | E05D 11/10 |
| 10,060,169 | B2 * | 8/2018 | Chen | E05D 3/142 |
| 10,081,975 | B2 * | 9/2018 | Cooper | E05F 5/02 |
| 10,233,684 | B2 * | 3/2019 | Pyo | E05D 7/0009 |
| 10,240,377 | B2 * | 3/2019 | Arai | E05D 7/125 |
| 10,480,228 | B2 * | 11/2019 | Kim | E05D 7/0415 |
| 10,626,645 | B2 * | 4/2020 | Koshikawa | F16C 11/10 |
| 11,149,481 | B2 * | 10/2021 | Tanriverdi | E05D 7/123 |
| 11,313,162 | B2 * | 4/2022 | Olkay | E05D 7/1061 |
| 2004/0163211 | A1 * | 8/2004 | Rucker | E05D 11/1014 16/235 |
| 2006/0137139 | A1 * | 6/2006 | Wu | E05D 7/0423 16/236 |
| 2012/0102674 | A1 * | 5/2012 | King | E05D 7/0423 16/248 |
| 2016/0138319 | A1 * | 5/2016 | Wu | E05D 3/02 16/50 |
| 2016/0153221 | A1 * | 6/2016 | Dodge | E05D 7/0415 16/238 |
| 2021/0148147 | A1 * | 5/2021 | Capur | E05F 5/006 |
| 2022/0120125 | A1 * | 4/2022 | Lenze | E05D 7/12 |

FOREIGN PATENT DOCUMENTS

| | | | |
|---|---|---|---|
| DE | 102017129427 | B3 | 11/2018 |
| EP | 0698712 | A1 | 2/1996 |
| EP | 2754813 | A2 | 7/2014 |
| EP | 3147438 | A1 | 3/2017 |
| FR | 2796979 | A1 | 2/2001 |
| WO | 2005/052292 | A2 | 6/2005 |

OTHER PUBLICATIONS

PCT, The International Bureau of WIPO, English translation of International Preliminary Report on Patentability and Written Opinion, International Application No. PCT/DE2019/100161, 9 pages (dated Sep. 3, 2020).

* cited by examiner

HINGE AND METHOD FOR ADJUSTING A HINGE

TECHNICAL FIELD

The present disclosure describes a hinge having a first hinge element for disposal on a closing element, and a second hinge element for disposal on a frame, said hinge elements being connected to one another so as to be articulated about a hinge axis. A method for adjusting a hinge having a first hinge element for disposal on a closing element, and a second hinge element for disposal on a frame, said hinge elements being connected to one another so as to be articulated about a hinge axis forms a further subject matter of the invention.

BACKGROUND

Hinges are used in openings which are designed so as to be closable, such as doors, portholes and windows, for example. Said hinges in these closable openings enable an articulated disposal of closing elements such as door leaves, porthole windows, hatches, window leaves, or covers, on a frame which surrounds the opening. The hinge herein guides the movement of the closing element in such a manner that the closing element can be transferred in a simple manner to an opened position for releasing the opening and to a closed position for closing the opening.

Hinges have two hinge elements in order for this articulated disposal of the closing element on the frame to be enabled. A first hinge element is disposed on the closing element, and a second hinge element is disposed on the frame. Both closing elements are connected to one another so as to be articulated about a hinge axis. The hinge connects the frame and the closing element to one another in this way, and at the same time enables an articulated movement of the closing element in relation to the frame.

In order for the closing element to uniformly close the opening and herein also compress sealing elements such as sealing profiles or sealing beads which for sealing are disposed between the frame and the closing element, it is often necessary for the hinge to be aligned in order to equalize production tolerances, effects of wear and the like which arise in practical use. It is the objective of said alignment to position the hinge and thus the hinge axis in such a manner that the closing element in the closed position has a uniform spacing from the frame and at the same time exerts a uniform contact pressure on the sealing elements.

Said alignment is typically performed during assembly by disposing spacers, for example in the manner of shims or the like, between the hinge elements and the frame and/or the closing element. Said alignment however often proves to be very complex in practice, since the respective hinge element for attaching a spacer has to be released from the frame or from the closing element and subsequently has to be fastened thereto again. The spacers enable adapting to be carried out only in discrete steps, the latter depending on the thicknesses of the available spacers, on account of which uniform spacing and contact pressure can be achieved only to a limited extent. Moreover, subsequent adaptations of the alignment of the hinge, such as become necessary by virtue of the effects of wear, the use of other sealing elements, or a distortion of the frame and/or of the closing element, for example, are possible only to a limited extent and with a very high level of complexity. This is because the hinge also in these cases can only be adjusted by releasing the connection to the frame or the closing element in a complex manner.

SUMMARY

In an embodiment, an object of the disclosed hinge is to enable simpler and more precise alignment.

This object in a hinge of the type mentioned at the outset is achieved by at least one actuating element for adjusting the spacing of the hinge axis in relation to at least one of the two hinge elements.

The spacing of the hinge axis from one of the two hinge elements and thus from the frame and/or the closing element can be adjusted in a simple manner by way of the actuating element. The alignment of the hinge can take place in a stepless manner, independently of the thickness of available spacers. Releasing the hinge element from the frame and/or from the closing element is not necessary but nevertheless also possible. A uniform spacing of the closing element in the closed position from the frame and thus a contact pressure which is exerted in a uniform manner on the sealing elements can be achieved in a simple and highly precise manner by adjusting the spacing of the hinge axis.

The actuating element is preferably movable transversely to the hinge element. The spacing of the hinge axis can be particularly advantageously adjusted by a movement of the actuating element transverse to the hinge element.

The hinge axis is preferably disposed on an axle support which is disposed between the two hinge elements. By way of an axle support, the hinge axis can be disposed so as to be movable between the hinge elements in a simple manner in terms of construction. The axle support can also make possible a replacement of the hinge axle.

In this context, it is particularly advantageous for the axle support and the hinge axis to be conjointly adjustable by way of the actuating element. A compact construction mode which is of simple construction can be achieved. The axle support can serve as a support element for the hinge axis.

In an embodiment, an additional object is to provide a guide for guiding the actuating movements of the axle support. By way of a guide, the axle support can be guided in a manner which is simple in terms of construction. The clearance of the axle support transverse to the actuating direction of the actuating movements can be minimized, in particular suppressed, by the guide.

The guide is preferably formed from an axle-support-proximal guide region and a hinge-element-proximal guide region, said guide regions bearing on one another in the manner of a sliding guide. Faces of the two guide regions which bear on one another herein can enable guiding in the form-fitting manner, with the exception of an axial degree of freedom. The guide regions can be configured in a mutually complementary manner. The guide regions can particularly advantageously be configured so as to be form-fitting, in particular along a plurality of axes transverse to the actuating direction of the actuating movements of the axle support. A departure of the axle support from the guide can be avoided in a simple manner. Alternatively or additionally, the guide regions can also transmit hinge forces which act on the hinge and which act on the hinge from the outside, for example by way of the closing element. Stressing of the actuating element by said hinge forces, in particular transversely to the direction of the actuating movement of the actuating element and/or of the axle support, can be avoided, and the risk of damage to the actuating element can be minimized on account thereof.

In a refinement of the invention, the axle support and the hinge element are configured so as to be mutually complementary in the manner of plug-fit connection elements. The complementary shaping can enable a simple and reliable connection of the axle support to the hinge element. Guiding of the actuating movement can take place in a simple manner in terms of construction by way of the complementary shaping of regions of the stretch-connection elements which bear on one another. The axle support can completely or partially encompass in particular mutually opposite sides of the hinge element, or be encompassed by the hinge element.

It is furthermore advantageous for the axle support to have a joint pin for the articulated disposal of a link eye of the respective other of the two hinge elements. The joint pin can provide a bearing for disposing the link eye in the manner of a rotary joint. Said joint pin can run so as to be coaxial with the hinge axis. The hinge element can be disposed on the axle support in a simple manner in terms of construction by way of a link eye which completely or partially surrounds the joint pin.

In this context, it is particularly advantageous for the link eye of the hinge element to have a locking mechanism by way of which the link eye can be released from the joint pin or be locked to the latter. The hinge element by way of the locking mechanism can be released from the remaining elements of the hinge or be connected to the latter. The two hinge elements can be separated from one another in the released state. The locking mechanism can be movable transversely to the joint pin and/or engage behind the joint pin in order for the link eye to be locked, preferably on the side facing away from the link eye. The hinge can therefore be assigned a dual function. Said hinge can be used as a joint between the closing element and the frame as well as a closure for closing the closing element on the frame. To this extent, the hinge can be a hinge configured as a closure hinge. In this case, it is advantageous for two closure hinges to be in each case disposed on both sides of the closing element, such as is described in DE 10 2017 129 427, for instance. The locking mechanism can be activated by way of an activation device in order for the link eye to be released or locked.

Two actuating elements are preferably provided and disposed on both sides of the joint pin. Two actuating elements permit an oblique position in relation to the hinge element. The hinge axis can be inclined in relation to the hinge element by dissimilarly adjusted spacings. The adjustable inclination of the hinge axis can be used for compensating any distortion of the frame and/or of the closing element. A disposal of the actuating elements on both sides of the joint pin permits a reliable adjustment of the spacing of the hinge axis that runs so as to be coaxial with the joint pin from the hinge element, said adjustment being stable in terms of unintentional movements. The two actuating elements can support the joint pin along the actuating direction in the manner of a dual-point support bearing.

A further design embodiment provides that the actuating element comprises a thread for connecting to a mating thread of the hinge element and/or a groove for the rotatable but axially fixed disposal on the axle support. The thread of the actuating element as an external thread can interact with a mating thread of the hinge element that is configured as an internal thread, or as an internal thread interact with a mating thread of the hinge element that is configured as an external thread. The adjustment of the spacing of the hinge axis from the hinge element can take place in a stepless manner by rotating the thread relative to the mating thread. The rotating movement of the actuating element can be converted to a linear actuating movement of the axle support. The actuating element can be designed in a screw-like manner, having a head which is diametrically opposite the thread. The head preferably comprises a drive region, in particular in the form of a hexagonal socket, a hexagonal pilot, a hexalobular socket, a slot, or a cross head, for driving the actuating element by way of a correspondingly configured drive apparatus such as a manual screwdriver or an electric screwdriver. On account of the groove, the actuating element can be mounted on the axle support so as to be freely rotatable in the circumferential direction. The groove is preferably disposed between the thread and the head of the actuating element. Said groove can be configured in the manner of a circumferential groove having a radial diameter which is smaller than the thread and/or the head of the actuating element.

In a further embodiment of the invention, the axle support comprises a bearing opening having a bearing region for transmitting shear and traction forces, and a larger plug-fit region for plug-fitting the at least one actuating element. The bearing region can have an internal diameter which is smaller than the external diameter of the thread and/or of the head of the actuating element. A departure of the closing element from the bearing region along the axial direction can therefore be prevented by way of a form-fit. The bearing region can be configured in such a manner that said bearing region receives the actuating element, in particular a groove of the actuating element, in a substantially form-fitting manner. On account of a substantially form-fitting mounting of the actuating element, the latter can be fixed along the axial direction thereof. The shear and traction forces for adjusting the spacing from the hinge element can be transmitted in a simple manner from the actuating element to the axle support. The plug-fit region can have an internal diameter which is larger than the external diameter of the thread and/or of the head of the actuating element. The actuating element can be plug-fitted in the larger plug-fit region of the bearing opening with the smaller thread-proximal and/or head-proximal end leading. In order for the actuating element to be transferred from the plug-fit region to the bearing region of the bearing opening, the actuating element and/or the axle support can be moved in a manner substantially transverse to the actuating direction. The movement of the actuating element can preferably take place when the actuating element is not yet disposed on the hinge element. The movement of the axle support can preferably take place once the actuating element has already been disposed on the hinge element. For a transfer from the bearing region to the plug-fit region, the movement can take place in the opposite direction. The bearing region and the plug-fit region can form two diametrically opposed ends of the bearing opening.

In one preferred refinement of the invention the bearing region and the plug-fit region form a keyhole-shaped bearing opening. A keyhole-shaped bearing opening in which the bearing region and the plug-fit region are substantially round and are connected to one another by an elongate bore enables the actuating element to be transferred between the plug-fit region and the bearing region in a simple manner in terms of construction. Alternatively, the bearing region and the plug-fit region can also form a bearing opening of any other geometric shape, for example a triangular, trapezoidal, deltoid, or L-shaped bearing opening, in particular having radiused corner regions.

The bearing regions of at least two bearing openings preferably face one another. In a hinge having a plurality of actuating elements, the actuating elements on account of the disposal of the bearing openings with mutually facing bearing regions can mutually secure one another against departing from the bearing region. This is because the actuating elements would have to be transferred from the bearing region to the plug-fit region in order to be able to depart. On account of the mutually facing disposal of the bearing regions, the actuating elements herein would have to move in opposite directions, this not being possible in particular in the case of actuating elements which are disposed on the hinge element. Moreover, a movement of the axle support that transfers the actuating elements to the plug-fit regions can also be prevented. This is because the axle carrier would have to be moved simultaneously along two opposite directions.

In a method of the type mentioned at the outset it is proposed in order for the afore-mentioned object to be achieved that the spacing of the hinge axis in relation to at least one of the two hinge elements is adjusted by way of at least one actuating element.

The advantages which have already been explained in the context of the hinge are derived. The spacing of the hinge axis from one of the two hinge elements and thus from the frame and/or the closing element can be adjusted in a simple manner by way of the actuating element. The alignment of the hinge can take place in a stepless manner, independently of the thickness of available spacers. Releasing the hinge element from the frame and/or the closing element is not necessary but nevertheless also possible. A uniform spacing of the closing element in the closed position from the frame and a contact pressure which is exerted in a uniform manner on the sealing elements can be achieved by adjusting the spacing of the hinge axis.

The features described in the context of the hinge according to the invention may be used individually or in combination also in the method. The described advantages are derived.

With a view to the method, it has proven advantageous for the actuating element to be plug-fitted in a plug-fit region of an axle support and, in order to engage a groove in a bearing region, for the axle support and the actuating element to be mutually displaced transversely to the plug-fitting direction. The actuating element for adjusting the spacing of the hinge axis can be disposed so as to be axially fixed on the axle support in a manner which is rapid and simple in terms of construction.

BRIEF DESCRIPTION OF THE DRAWINGS

Further details and advantages of a hinge according to the invention as well as of a method for adjusting the hinge are to be explained in an exemplary manner hereunder by means of two exemplary embodiments of the invention which are schematically illustrated in the figures in which.

DETAILED DESCRIPTION

Hinges 1 have two hinge elements 2, 3 which are articulated so as to be mutually pivotable and which enable a closing element such as, for example, a door leaf, a porthole window, window leaf, a cover, or a hatch, to be pivoted in relation to a frame. To this end, a hinge element 2 is disposed on the closing element, and a hinge element 3 is disposed on the frame. An opening which is surrounded by the frame and which can be, for example, a door, a porthole, or a window, herein can be closed or released in a simple manner.

In order for uniform closing of the opening by the closing element to be enabled and also for a sealing element, such as a sealing lip or a sealing bead, which is disposed between the frame and the closing element to be compressed herein for sealing, the hinge 1 has to be aligned. The hinge 1 according to the invention enables a simple and precise alignment. Two potential exemplary embodiments of said hinge 1 are to be discussed in more detail hereunder by means of the figures. According to the invention, the frame does not have to be a separate element. The frame can also be formed by the edge of a wall or similar that surrounds the opening.

Figure 1:
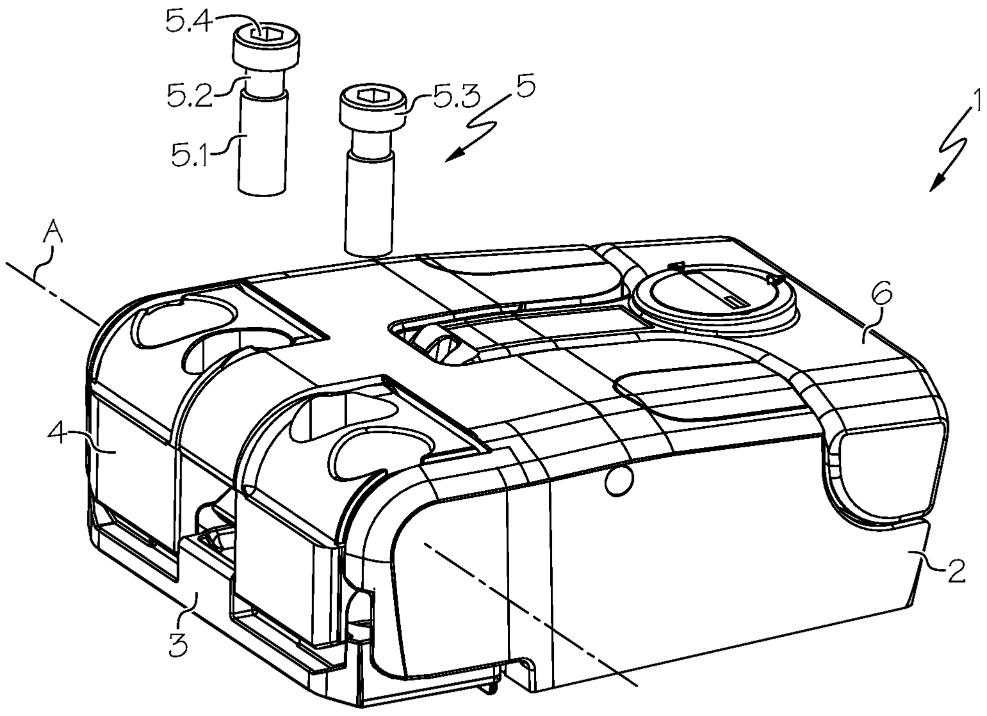
FIG. 1 shows a perspective view of a first exemplary embodiment of a hinge having actuating elements which are spaced apart from the hinge elements.
Figure 2:
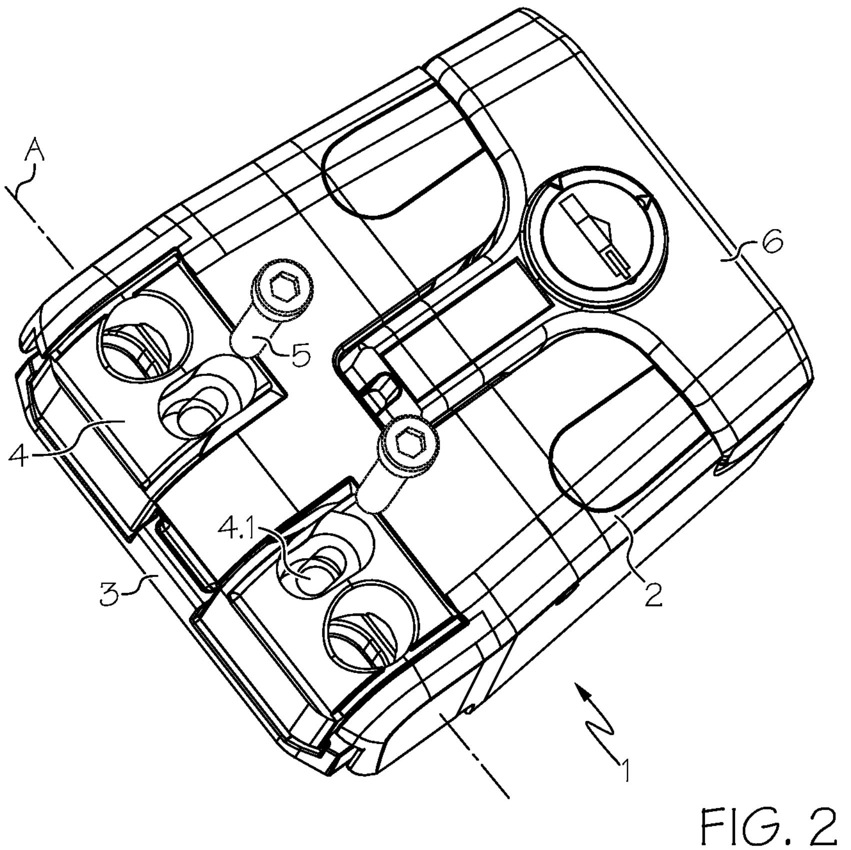
FIG. 2 shows a further view of the hinge according to FIG. 1, seen from another direction.

FIG. 1 and FIG. 2 herein show different perspective views of a first exemplary embodiment of the hinge 1. The hinge element 2, by way of connecting means on the lower side (not illustrated) of said hinge 2, can be disposed on a closing element. The hinge element 3 is disposed on the frame (not illustrated) of the opening. Nevertheless, it is also possible for either of the two, or both, hinge elements 2, 3 to also be partially or entirely disposed within the closing element or the frame, respectively. The hinge element 2 can likewise be disposed on the frame, and the hinge element 3 can likewise be disposed on or in the closing element.

The box-shaped hinge element 2 and the elongate hinge element 3 are preferably composed of injection-molded plastics material but may also comprise metallic elements, in particular in the region of the hinge axis A, or be completely composed of metal.

The illustrated hinge 1 is configured in the manner of a closure hinge. Said hinge 1 has an activating device 6 which is disposed on the hinge element 2, the function of said activating device 6 yet to be described in more detail.

The two hinge elements 2, 3 are connected to one another by way of a hinge axis A in an articulated manner such that said two hinge elements 2, 3 can be mutually pivoted. The hinge axis A runs so as to be substantially parallel to the plane of the closing element (not illustrated). In order for the spacing of the hinge axis A in relation to the hinge element 3 to be adjusted, the illustrated hinge 1 has two actuating elements 5, wherein a single actuating element 5 would however also be sufficient for adjusting the space of the hinge axis A according to the invention.

The actuating elements 5 for visualization are illustrated so as to be spaced apart in relation to the hinge elements 2, 3 in FIG. 1 and FIG. 2. In the assembled state of the hinge 1, the actuating elements 5 are however plug-fitted in bearing openings 4.1 of an axle support 4 which is disposed between the two hinge elements 2, 3. Said axle support 4 supports the hinge axis A. By varying the spacing of the axle support 4 in relation to the hinge element 3, the spacing of the hinge axis A in relation to the hinge element 3 herein is simultaneously adjusted in a simple manner in terms of construction.

As can be seen in FIG. 1, the cylindrical actuating element 5 has a thread 5.1 which serves for connecting the actuating element 5 to the hinge element 3. The actuating element 5 on the side which is diametrically opposite the thread 5.1 has a head 5.3 which forms the termination of the actuating element 5. The head 5.3 has a radius which is larger than that of the thread 5.1 but may also be configured so as to have a radius which is identical to that of the thread 5.1. Moreover, the head 5.3 comprises a drive region 5.4 which is configured in the manner of a hexagonal socket. Alternatively, the drive region 5.4 can be configured in the form of a hexagonal pilot, a hexalobular socket, a slot, or a cross head. The actuating element 5 by way of said drive region 5.4 is coupled to a drive apparatus (not illustrated) such as a screw driver or an electric screwdriver, for example, for driving the actuating movement. The actuating element 5 overall has a substantially screw-like geometry.

In order to be disposed on the axle support 4, the actuating element 5 by way of a groove 5.2 has a circumferential constriction. The groove 5.2 is delimited by the thread 5.1 and the head 5.3 but may nevertheless also be spaced apart from said thread 5.1 and said head 5.3. The groove 5.2 enables a rotatable yet axially fixed disposal on the axle support 4. To this end, the groove 5.2 is configured in the manner of a variation of the radius which is abruptly sent back toward the inside. This enables the groove 5.2 to be mounted in a form-fitting manner in the bearing opening 4.1. Shear and traction forces for setting the spacing in relation to the hinge element 3 herein can be transmitted from the actuating element 5 to the axle support 4.

Figure 3:
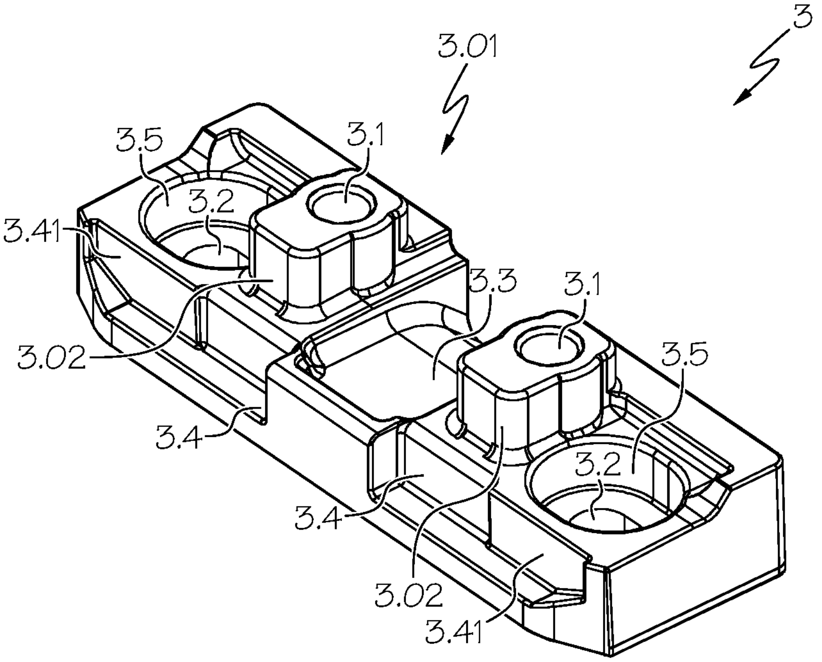
FIG. 3 shows a perspective view of a hinge element according to FIG. 1.

The hinge element 3 illustrated in FIG. 1 will be explained in more detail hereunder by means of the illustration in FIG. 3. Said hinge element 3 has a bar-shaped geometry having a height which is substantially less than the length. Two protrusions 3.02 protrude from the side 3.01 that faces the axle support 4. Said protrusions 3.02 support in each case one mating thread 3.1 which for connecting the actuating element 5 interacts with the thread 5.1 of the latter. The mating thread 3.1 is configured as an internal thread of a threaded bore.

Apart from the protrusions 3.02, the hinge element 3 has in each case one countersink 3.5 in which a connection recess 3.2 is located. Said connection recess 3.2 herein serves for disposing the hinge element 3 on the frame, wherein a connecting means (not illustrated) such as, for example, a screw or a rivet, is guided through the connection recess 3.2. The hinge element 3 can in this way be connected directly to the frame, or can be connected to one or a plurality of further elements for disposal on the frame. The countersink 3.5 ensures that the connecting means does not protrude from the side 3.01 of the hinge element 3 and does not impede the actuating movement of the axle support 4.

A recess 3.3 which is disposed between the mating threads 3.1 in the assembled state of the hinge 1 permits a free rotating movement of the hinge element 2 which is disposed about the hinge axis A. Any collision of the regions of the hinge element 2 that are disposed about the hinge axis A of the axle support 4 and the hinge element 3 is avoided on account of the recess 3.3. The hinge element 2 is provided with sufficient freedom of movement even at a minor spacing of the hinge axis A from the hinge element 3.

The hinge element 3 moreover has a guide region 3.4 for guiding the actuating movement of the axle support 4. Said guide region 3.4 interacts with a guide region 4.4 of the axle support 4 illustrated in FIG. 4. Both guide regions 3.4, 4.4 conjointly form a guide for guiding the actuating movement of the axle support 4. To this end, said guide regions 3.4, 4.4 by way of the contact faces 3.41, 4.41 bear on one another in the manner of a sliding guide. The guide region 3.4 divided into two parts is configured so as to be complementary to the guide region 4.4 and receives the latter, this enabling the movement of the axle support 4 to be guided in a form-fitting manner. Hinge forces which act transversely to the actuating element 5, that is to say substantially parallel to the side 3.01, are transmitted from the axle support 4 to the hinge element 3 by the guide 3.4, 4.4. An impingement of the actuating element 5 with said hinge forces, which is disadvantageous in terms of connection technology, is prevented. The actuating elements 5 to this extent lie outside the flux of force.

The hinge element 3 and the axle support 4, by way of the guide 3.4, 4.4, are configured in the manner of interacting plug-fit connection elements. The axle support 4 by way of the guide region 4.4 herein partially encompasses the hinge element 3 along the section plane illustrated in FIG. 5. In contrast, the guide region 3.4 along the longitudinal direction of the hinge element 3, that is to say transversely to the section plane of FIG. 5, surrounds the guide region 4.4 of the axle support 4 and thus receives said guide region 4.4.

Figure 4:
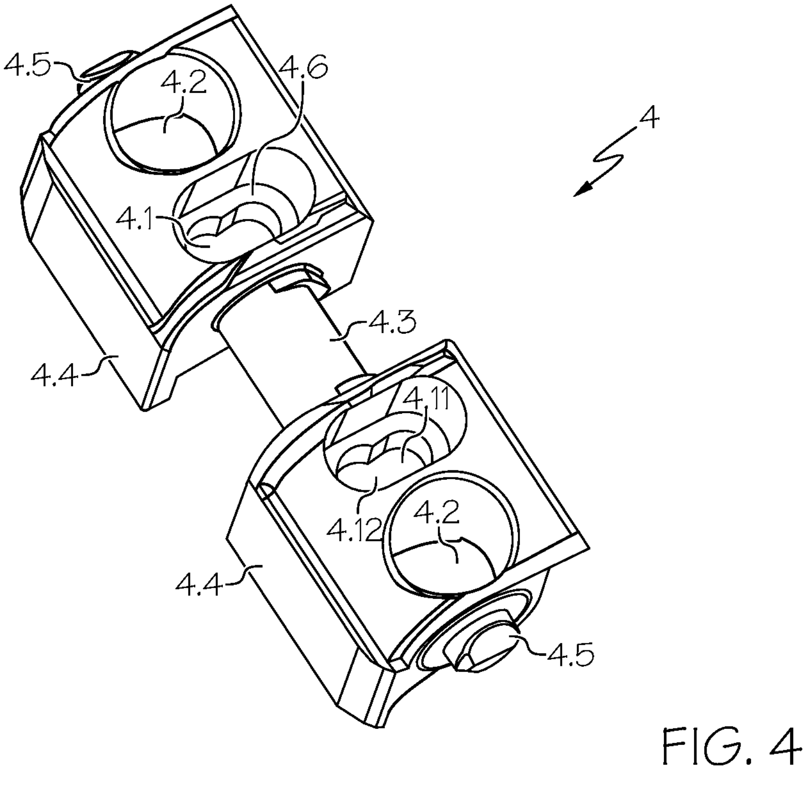
FIG. 4 shows a perspective view of an axle support according to FIG. 1.
Figure 7:
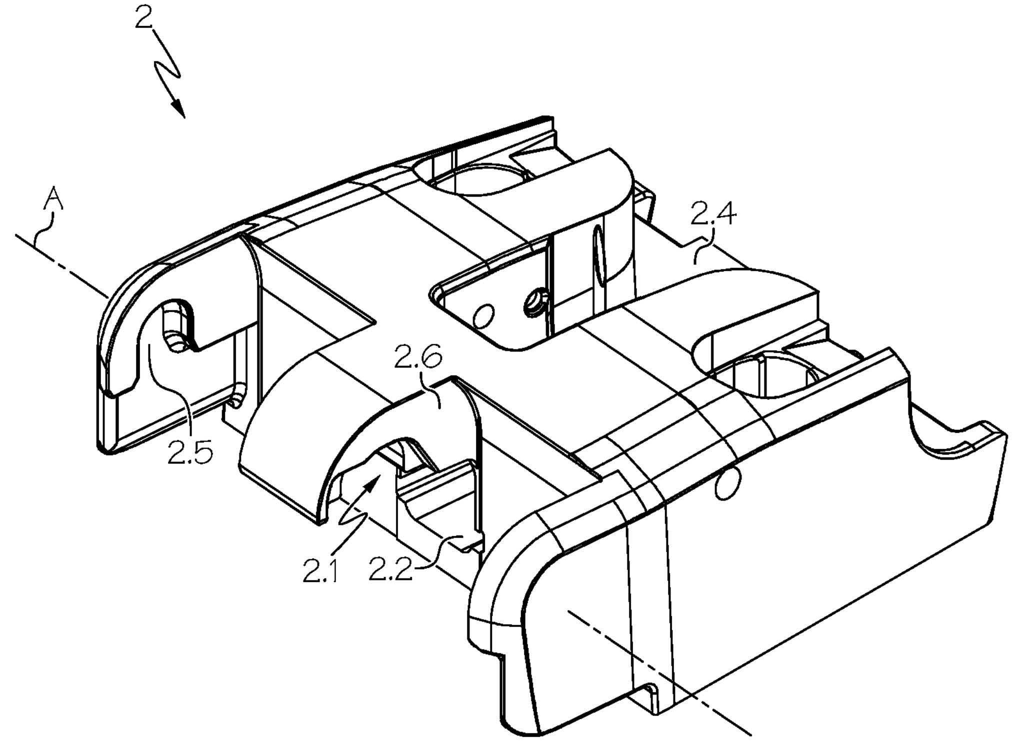
FIG. 7 shows a perspective view of a hinge element according to FIG. 1.

The axle support 4 according to FIG. 1 is illustrated in more detail in FIG. 4. The spacing of the axle support 4 from the hinge element 3, conjointly with the spacing of the hinge axis A, can be set by way of the actuating element 5. The dumbbell-shaped axle support 4 has a cylindrical joint pin 4.3 which, for disposing the hinge element 2 in an articulated manner, is disposed so as to be coaxial with the hinge axis A. Moreover, the axle support 4 has two connection elements 4.5 which are mutually opposite along the hinge axis A. Said connection elements 4.5 likewise serve for connecting to the hinge element 2 and engage in receptacles 2.5 of the hinge element that are illustrated in FIG. 7.

Passages 4.2 render the connecting means accessible from the outside in order for the hinge element 3 to be connected by way of the connection recesses 3.2, without the axle support 4 having to be removed to this end. For this purpose, the passages 4.2 are disposed on the axle support 4 in such a manner that said passages 4.2 in the assembled state of the hinge 1 are aligned with the connection recesses 3.2.

The bearing openings 4.1 are disposed on both sides of the joint pin 4.3, a disposal of the actuating elements 5 on both sides being achieved on account thereof. The two actuating elements 5, apart from adjusting the spacing of the hinge axis A in relation to the hinge element 3, also enable the hinge axis A to be inclined. A distortion of the closing element and/or of the frame due to production tolerances or use can be equalized by the adjustable oblique positioning of the hinge axis A. Dissimilar spacings between the hinge axis A and the hinge element 3 are adjusted herein by means of the actuating elements 5, on account of which an inclination of the hinge axis A in relation to the hinge element 3 results.

As described above, the actuating element 5 is mounted in a bearing opening 4.1 of the axle support 4. The bearing opening 4.1 has a bearing region 4.11 and a plug-fit region 4.12. The plug-fit region 4.12 is dimensioned so as to be larger in comparison to the bearing region 4.11. This enables the actuating element 5 to be plug-fitted in the plug-fit region 4.12 with the thread 5.1 and/or the head 5.3 leading. To this end, the internal radius of the plug-fit region 4.12 is at least the size of the external diameter of the thread 5.1 and/or of the head 5.3 of the actuating element 5.

In contrast, the bearing region 4.11 has an internal diameter which is less than the external diameter of the thread 5.1 and/or of the head 5.3 of the actuating element 5. On account of said smaller internal diameter of the bearing region 4.11 it is prevented that an actuating element 5 that is mounted in the bearing region 4.11 can depart from the bearing region 4.11 in the axial direction. An axial restriction of the freedom of movement of the actuating element 5 is achieved. The radius of the bearing region 4.11 corresponds substantially to the external diameter of the groove 5.2 of the actuating element 5. The axial dimension of the bearing region 4.11 likewise corresponds substantially to the axial length of the groove 5.2. The groove 5.2 can in this way be mounted in a form-fitting manner in the bearing region 4.11. The shear and traction forces for adjusting the spacing from the hinge element 3 are thus transferred from the actuating element 5 to the axle support 4.

The bearing region 4.11 and the plug-fit region 4.12 form a keyhole-shaped bearing opening 4.1 in which the two substantially circular regions 4.11 and 4.12 are connected to one another by way of an elongate bore which runs between the two regions 4.11, 4.12. The smaller diameter of said elongate bore herein corresponds substantially to the internal diameter of the bearing region 4.11.

In order for the head 5.3 of the actuating element 5 to be received, the bearing opening 4.1 is disposed in a countersink 4.6. This enables the actuating element 5 to be mounted in the bearing opening 4.1 and prevents the head 5.3 from projecting from the upper side of the axle support 4.

The bearing opening 4.1 and the guide region 4.4 are mutually disposed in such a manner that the actuating element 5, which in the case of the assembled hinge 1 in which the guide region 4.4 bears on the guide region 3.4 is established by way of the mating thread 3.1, cannot be transferred from the bearing region 4.11 to the plug-fit region 4.12. Any unintentional departure of the actuating element 5 from the bearing opening 4.1, and thus a release of the axle support 4 from the actuating element 5, is prevented in the assembled state.

When assembling the hinge 1, the actuating element 5 is first plug-fitted in the plug-fit region 4.12 of the axle support 4 and, in order for the groove 5.2 to engage in the bearing region 4.11, is displaced transversely to the plug-fitting direction. The actuating element 5 mounted in the axle support 4 is subsequently connected to the hinge element 3 by means of the thread 5.1 and the mating thread 3.1. Alternatively, an engagement between the thread 5.1 and the mating thread 3.1 is first established, and the axle support 4 is subsequently plug-fitted on the actuating element 5 in such a manner that the actuating element 5 is plug-fitted in the plug-fit region 4.12. Thereafter, the axle support 4 is displaced in relation to the actuating element 5 and the hinge element 3 in order for the actuating element 5 to be transferred to the bearing region 4.11. The second alternative requires that the axle support 4 by way of the actuating element 5 can be spaced apart from the hinge element 3 in such a manner that the guide regions 3.4, 4.4 no longer bear on one another.

Figure 5:
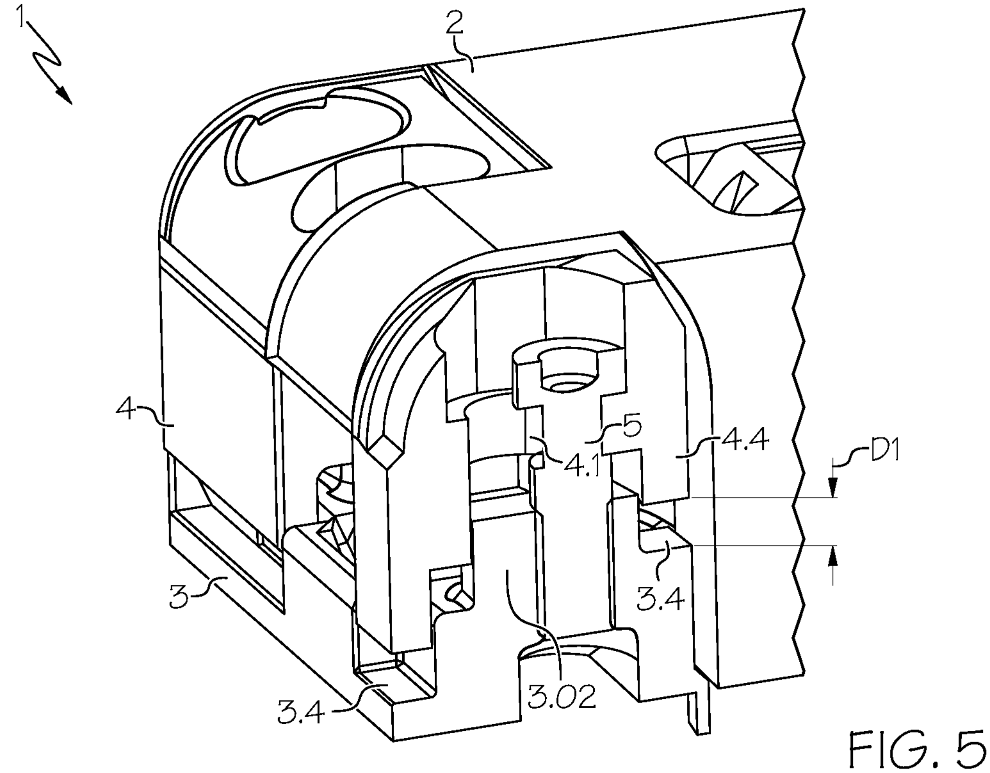
FIG. 5 and FIG. 6 show sectional views of the hinge according to FIG. 1 for the comparison of dissimilarly adjusted spacings.
Figure 6:
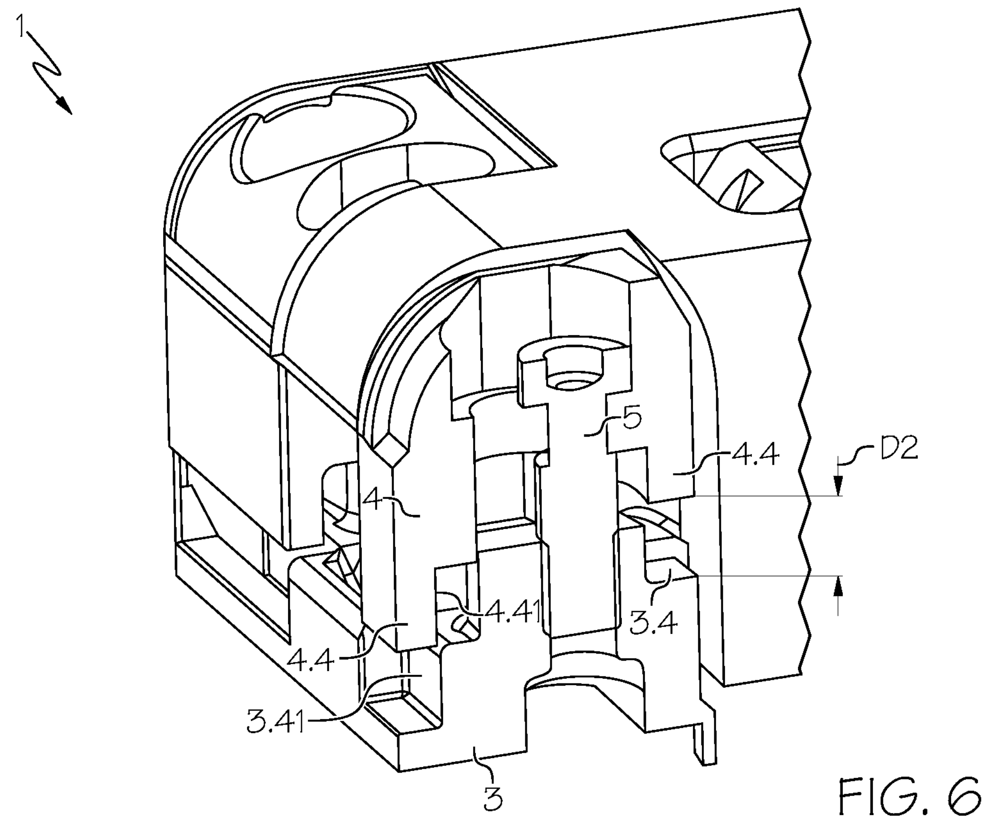

FIG. 5 and FIG. 6 show sectional views of the hinge 1 according to FIG. 1 for dissimilarly adjusted spacings of the hinge axis A from the hinge element 3. There is a smaller spacing D1 between the hinge element 3 and the axle support 4 in FIG. 5. The guide regions 3.4 and 4.4 bear on one another. The protrusion 3.02 herein forms part of the guide region 4.4 and in terms of length extends the latter along the axial direction of the actuating element 5. Hinge forces which act transversely to the axis of the actuating element 5 can be transferred from the axle support 4 to the hinge element 3 without having any effect on the actuating element 5.

In order for the spacing D1 to be varied and thus also for the spacing of the hinge axis A disposed on the axle support 4 from the hinge element 3 to be adjusted, the adjustment element 5 is rotated about the longitudinal axis thereof. On account of the interaction between the thread 5.1 and the mating thread 3.1, this rotating movement is converted to an axial longitudinal movement of the actuating element 5. A shear or traction force exerted on account of the axial longitudinal movement is transferred to the axle support 4 by way of the axial fixing of the actuating element 5 described above. The axle support 4 by way of the shear or traction force is moved away from the hinge element 3 or toward the latter and herein is guided by the guide 3.4, 4.4.

The maximum achievable spacing D2 which still permits a guided movement is shown in FIG. 6. The contact faces 3.41 and 4.41 of the guide regions 3.4, 4.4 in the region of the section illustrated on the left still bear on one another, while the parts of the guide regions 3.4, 4.4 illustrated on the right already no longer bear on one another.

FIG. 7 shows a perspective view of the closing-element-proximal hinge element 2. The slot-shaped receptacles 2.5 in which the connection elements 4.5 engage in order to connect the axle support 4 to the hinge element 2 can be seen. A link eye 2.1 as part of a rod-shaped protrusion 2.6 lies along the hinge axis A between said receptacles 2.5. Said link eye 2.1 is disposed on the joint pin 4.3 of the axle support 4 and enables the articulated connection of the two hinge elements 2, 3 by means of the axle support 4. To this end, the joint pin 4.3 bears on the internal face of the link eye 2.1, this enabling articulated guiding of the pivoting movement of the hinge element 2 in relation to the axle support 4. The link eye 2.1 is configured in the manner of a passage opening through the protrusion 2.6, said passage opening been open on one side of the circumference. In order to be disposed on the joint pin 4.3, the link eye 2.1 in the direction of the region that is open on one side can be moved toward the joint pin 4.3. Alternatively, the link eye 2.1 can also be configured as a circumferentially closed passage opening, on account of which a circumferential form-fit between the joint pin 4.3 and the link eye 2.1 can be achieved.

A link eye 2.1 which is open on one side permits the link eye 2.1 to be released and locked in a simple manner on the joint pin 4.3. To this end, the hinge element 2 has a locking mechanism 2.3 which can be seen in FIG. 8, for example. Said locking mechanism 2.3 for locking the link eye 2.1 to the joint pin 4.3 is moved out of a recess 2.2 in a manner parallel to the protrusion 2.6, and for releasing said link eye 2.1 from the joint pin 4.3 is moved into the recess 2.2 in a manner parallel to the protrusion 2.6. The locking mechanism 2.3 in the locked state locks the link eye 2.1 that is open on one side in such a manner that the link eye 2.1 and the locking mechanism 2.3 bear in a form-fitting manner on the joint pin 4.3. The locking mechanism 2.3 in the unlocked state is moved into the recess 2.2 in such a manner that said locking mechanism 2.3 releases the joint pin 4.3 bearing on the link eye 2.1. The locking mechanism 2.3 in the unlocked state is preferably completely retracted into the recess 2.2.

The activating device 6 which is configured in the manner of a handle and is disposed in the recess 2.4 of the hinge element 2 serves for activating the locking mechanism 2.3.

The hinge 1 equipped with a locking mechanism 2.3, apart from the function as a hinge, can at the same time also be used in the manner of a closure hinge for closing and/or locking. The hinge 1 can thus be used as a replacement for or as an addition to a lock. If a plurality of said hinges 1 are used at various locations of the closing element of a closable opening, said hinges 1 can enable the opening direction of the closing element to be selected. The link eye 2.1 of the hinge 1 about which the closing element is to be pivoted, herein can remain in a position locked to the joint pin 4.3, while the link eyes 2.1 of the remaining hinges 1 by moving the respective locking mechanism 2.3 are released from the joint pins 4.3 assigned to said link eyes 2.1. The closing element in this instance can be pivoted about the hinge 1 which is still locked. In order for the closing element to be locked in the closed position thereof, the respective joint pins 4.3 and link eyes 2.1 of the hinges 1 are locked to one another. Particularly stable locking of the closing element can be achieved in this way.

A further exemplary embodiment of a hinge 1 according to the invention is to be discussed hereunder. Elements with equivalent functions herein are identified by the same reference signs as have already been used in the description of the first exemplary embodiment. The substantial difference in comparison to the first exemplary embodiment lies in design details of the hinge element 3 and of the axle support 4. Only the points of differentiation in relation to the first exemplary embodiment will therefore be discussed hereunder, wherein the description above to this extent also applies to the second exemplary embodiment.

Figure 8:
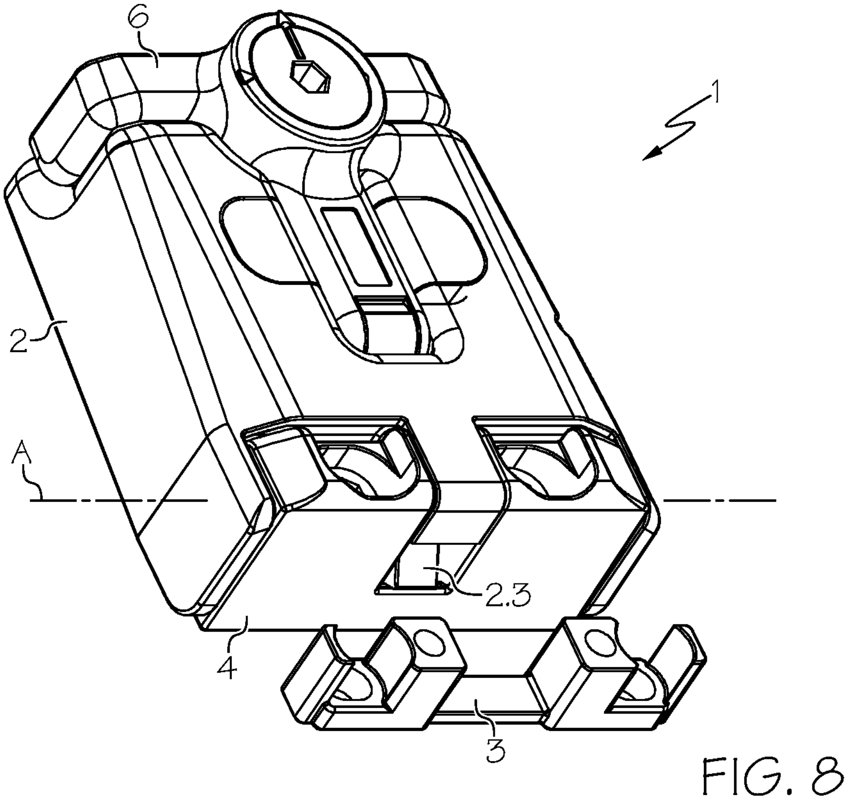
FIG. 8 shows a perspective view of a second exemplary embodiment of a hinge having a hinge element which is illustrated so as to be spaced apart.

FIG. 8 shows the hinge 1 having the two hinge elements 2, 3, the axle support 4, and the activating device 6. The activating device 6 and the hinge element 2 differ from the first exemplary embodiment only in terms of the shape of their contours, while their technical functionality is not affected thereby. The axle support 4 is configured so as to be more square-edged and has lines which do not flow as much in comparison to the first exemplary embodiment, on account of which a smaller width transverse to the hinge axis A is achieved in a space-saving manner. The hinge element 3 in FIG. 8 is illustrated separately from the axle support 4. This is for the sake of clarity since the axle support 4 in the assembled state of the hinge 1 obscures the hinge element 3.

Figure 9:
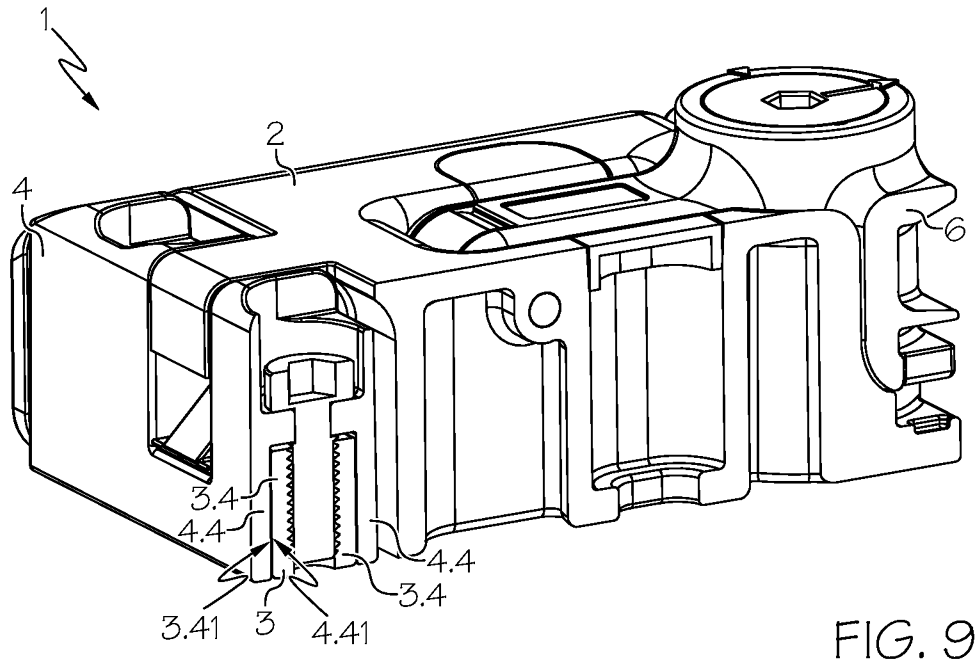
FIG. 9 shows a sectional view of the hinge according to FIG. 8.

FIG. 9 shows a sectional illustration of the hinge at a spacing of the hinge axis A from the hinge element 3 that is adjusted to the minimum. The actuating movement of the axle support 4 on both sides in the direction of the section as well as transverse to the latter is guided by the two guide regions 3.4, 4.4 which bear on one another. The guide region 4.4 of the axle support 4 encompasses the guide region 3.4 of the hinge element 3 on both sides. For guiding the actuating movement, the inward-facing contact face 4.41 of the axle support 4 herein bears on the outward-facing contact face 3.41 of the hinge element 3.

Figure 10:
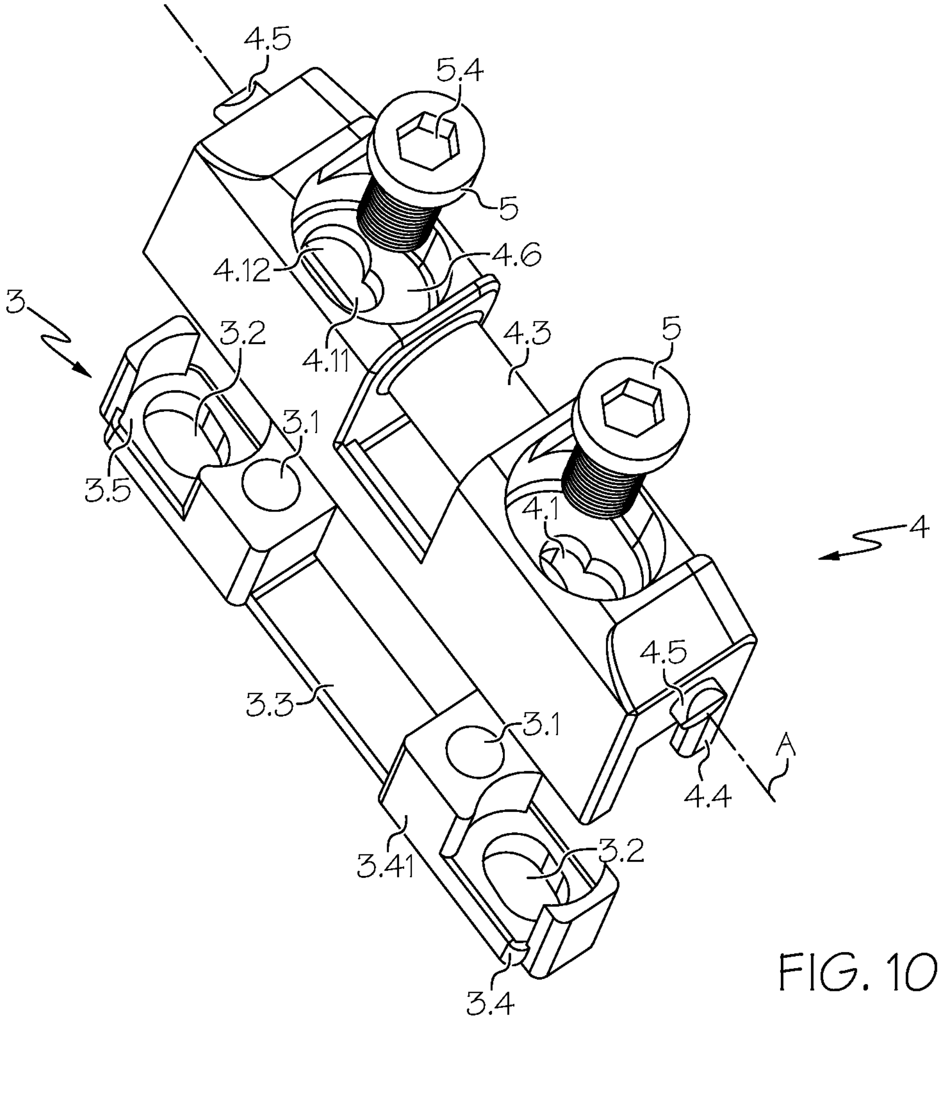
FIG. 10 shows an exploded illustration of the hinge element, the axle support, and the actuating elements according to FIG. 8.

As can be seen in FIG. 10, apart from extending along the long sides of the axle support 4 or of the hinge element 3, respectively, the guide regions 3.4 and 4.4 also extend along the respective short sides. The internal circumferential face of the axle support 4 and the external circumferential face of the hinge element 3 in a manner which is simple in terms of construction form the contact faces 3.41, 4.41 which bear on one another in order for the actuating movement to be guided. The axle support 4 and the hinge element 3 are shaped so as to be mutually complementary in the manner of a plug-fit connection in which the axle support 4 circumferentially surrounds the plank-shaped hinge element 3.

In order for the actuating elements 5 to be mounted, the axle support 4 again has keyhole-shaped bearing openings 4.1 which are disposed in countersinks 4.6. The two bearing openings 4.1 are mutually aligned in such a manner that the bearing regions 4.11 of the two bearing openings 4.1 face one another. An additional safeguard against the actuating elements 5 departing from the bearing openings 4.1 is achieved on account thereof.

Since the grooves 5.2 prevent any departure of the actuating elements 5 from the bearing regions 4.11 in the axial direction, the actuating elements 5 would have to be transferred to the larger plug-fit regions 4.12 in order to be able to depart from the latter. However, by virtue of the disposal of the bearing regions 4.11 so as to align with the mating threads 3.1, an actuating element 5 that is connected to the mating thread 3.1 cannot be freely transferred to the plug-fit region 4.12. The mutually facing bearing regions 4.11 of the bearing openings 4.1 moreover prevent that the axle support 4 in relation to the actuating elements 5 which are established relative to the hinge element 3 is displaced in such a manner that the actuating elements 5 enter the plug-fit regions 4.12. This is because the axle support 4 to this end would have to be moved along the hinge axis A in another direction for each of the two actuating elements 5. Such a movement which corresponds to a compression of the axle support 4 is not possible in the case of the fixed axle support 4. Therefore, the actuating elements 5 cannot depart from the bearing opening 4.1 without being released from the hinge element 3.

An alignment which is simpler and more precise can be achieved by using the hinge 1 described above and the method for adjusting the hinge 1.

LIST OF REFERENCE SIGNS

1 Hinge
2 Hinge element
2.1 Link eye
2.2 Recess
2.3 Locking mechanism
2.4 Recess
2.5 Receptacle
2.6 Protrusion
3 Hinge element
3.01 Side
3.02 Protrusion
3.1 Mating thread
3.2 Connection recess
3.3 Recess
3.4 Guide region
3.41 Contact face
3.5 Countersink
4 Axle support
4.1 Bearing opening
4.11 Bearing region
4.12 Plug-fit region
4.2 Passage
4.3 Joint pin
4.4 Guide region
4.41 Contact face
4.5 Connection element
4.6 Countersink
5 Actuating element
5.1 Thread
5.2 Groove
5.3 Head
5.4 Drive region
6 Activating device A Hinge axis
D1 Spacing
D2 Spacing

What is claimed is:

1. A hinge comprising:

a first hinge element configured to be mounted to a planar outer surface of a closing element;

a second hinge element configured to be mounted to a planar outer surface of a frame, the first and the second hinge elements being connected to one another to pivot about a hinge axis;

at least one actuating element coupled to at least one of the first or second hinge elements for adjusting the spacing of the hinge axis in relation to at least one of the first and the second hinge elements in a direction perpendicular to the outer surface of the closing element or the outer surface of the frame to which the associated hinge element is configured to be coupled;

an axle support disposed between the first and the second hinge elements, wherein the hinge axis is disposed on the axle support, wherein the axle support and the second hinge element are configured to fit together in a complementary manner to form a connection; and a guide that is configured to guide actuating movements of the axle support relative to the second hinge element in translation movement in a direction perpendicular to the hinge axis and parallel to a central axis of the at least one actuating element.

2. The hinge of claim 1, wherein the axle support and the hinge axis are conjointly adjustable by the at least one actuating element.

3. The hinge of claim 1, wherein the guide is formed from an axle-support-proximal guide region and a hinge-element-proximal guide region, the axle-support-proximal and hinge-element-proximal guide regions bearing on one another to form a sliding guide.

4. The hinge of claim 1, wherein the axle support includes a joint pin and the first hinge element includes a link with an opening or recess formed therein, and wherein the joint pin engages the opening or recess to enable articulated guiding of pivoting movement of the first hinge element relative to the axle support.

5. The hinge of claim 4, wherein the link of the first hinge element has a locking mechanism by way of which the link is configured to alternately be released from the joint pin and be locked to the joint pin.

6. The hinge of claim 4, wherein the at least one actuating element includes two actuating elements disposed on opposite sides of the joint pin.

7. The hinge of claim 1, wherein the at least one actuating element includes at least one of a thread for connecting to a mating thread of the second hinge element and a groove for rotatable but axially fixed disposal on the axle support.

8. The hinge of claim 1, wherein the axle support includes a bearing opening having a bearing region for transmitting shear and traction forces, and a larger region for receiving the at least one actuating element.

9. The hinge of claim 8, wherein the bearing region and the larger region form a keyhole-shaped bearing opening.

10. The hinge of claim 8, further comprising a supplemental bearing opening having a bearing region, and wherein the bearing regions of the bearing opening and the supplemental bearing opening are both positioned on an inner end of the associated bearing opening.

11. The hinge of claim 1 wherein the at least one actuating element is directly coupled to the second hinge element, wherein the second hinge element has a connection recess configured to receive a fastener there through to couple the second hinge element to the frame, and wherein the at least one actuating element is configured to move the hinge axis in a direction parallel to the connection recess.

12. The hinge of claim 1 wherein the first hinge element is mounted to the planar outer surface of the closing element, wherein the second hinge element is mounted to the planar outer surface of the frame, and wherein the at least one actuating element is configured to adjust the spacing of the hinge axis in relation to at least one of the first and the second hinge elements in a direction perpendicular to the outer surface of the closing element or the frame to which the associated hinge element is coupled.

13. A method for adjusting a hinge comprising:

providing a hinge having a first hinge element mounted to a planar outer surface of a closing element, a second hinge element mounted to a planar outer surface of a frame, the first and the second hinge elements being connected to one another to pivot about a hinge axis, the hinge further including at least one actuating element coupled to at least one of the first or second hinge elements, and an axle support disposed between the first and the second hinge elements, wherein the axle support and the second hinge element fit together in a complementary manner to form a connection, and wherein the hinge further includes a guide; and operating the at least one actuating element to adjust the spacing of the hinge axis in relation to at least one of the first and the second hinge elements in a direction perpendicular to the outer surface of the closing element or the outer surface of the frame to which the associated hinge element is coupled, wherein the hinge axis is disposed on the axle support, and wherein the guide guides actuating movements of the axle support relative to the second hinge element in translation movement in a direction perpendicular to the hinge axis and parallel to a central axis of the at least one actuating element.

* * * * *